(12) United States Patent
Wieschemann et al.

(10) Patent No.: US 11,242,229 B2
(45) Date of Patent: Feb. 8, 2022

(54) ARRANGEMENT OF A GANTRY LIFTING DEVICE AND OF A ROW OF SPACED-APART MARKING ELEMENTS

(71) Applicant: Konecranes Global Corporation, Hyvinkää (FI)

(72) Inventors: Armin Wieschemann, Oberhausen (DE); Heiko Schulz, Leverkusen (DE); Jan-Philipp Schmidt-Ewig, Essen (DE); Stefan Aldejohann, Langenfeld (DE); Heinz-Christoph Eichner, Ratingen (DE); Mohammad Ahmadian, Neuss (DE)

(73) Assignee: Konecranes Global Corporation, Hyvinkää (FI)

( * ) Notice: Subject to any disclaimer, the term of this patent is extended or adjusted under 35 U.S.C. 154(b) by 374 days.

(21) Appl. No.: 16/342,008

(22) PCT Filed: Oct. 12, 2017

(86) PCT No.: PCT/EP2017/076099
§ 371 (c)(1),
(2) Date: Apr. 15, 2019

(87) PCT Pub. No.: WO2018/073097
PCT Pub. Date: Apr. 26, 2018

(65) Prior Publication Data
US 2019/0248629 A1    Aug. 15, 2019

(30) Foreign Application Priority Data

Oct. 18, 2016   (DE) .......................... 102016119793.9

(51) Int. Cl.
*B66C 13/48*     (2006.01)
*B66C 13/22*     (2006.01)
(Continued)

(52) U.S. Cl.
CPC .............. *B66C 13/48* (2013.01); *B66C 13/18* (2013.01); *B66C 13/22* (2013.01); *B66C 13/40* (2013.01);
(Continued)

(58) Field of Classification Search
CPC ......... B66C 13/48; B66C 13/18; B66C 13/22; B66C 13/40; B66C 19/005; B66C 19/007; G05D 1/0261; G05D 2201/0205
See application file for complete search history.

(56) References Cited

U.S. PATENT DOCUMENTS

2010/0021272 A1* 1/2010 Ward .................... B65G 57/20
                                                                     414/137.1
2016/0332848 A1* 11/2016 Wieschemann ........ G05D 1/021

FOREIGN PATENT DOCUMENTS

CN   102452400 A   5/2012
CN   203512793 U   4/2014
(Continued)

OTHER PUBLICATIONS

International Search Report of the International Searching Authority from corresponding Patent Cooperation Treaty (PCT) Application No. PCT/EP2017/076099, indicated completed on Jan. 26, 2018.
(Continued)

*Primary Examiner* — Frederick M Brushaber
*Assistant Examiner* — Elizabeth Yang
(74) *Attorney, Agent, or Firm* — Gardner, Linn, Burkhart & Ondersma LLP (57) ABSTRACT

An arrangement of a gantry lifting device for handling containers, in particular ISO containers, having a sensor device for the navigation of the gantry lifting device and having a clearance profile which is formed such that the gantry lifting device can move across a container, and of a row of spaced-apart marking elements such that the gantry
(Continued)

lifting device can be moved along the row of marking elements by means of raster navigation, where the row of marking elements can be read by the sensor device of the gantry lifting device. The sensor device, in an operating position, is arranged outside the clearance profile on the gantry lifting device so as, in the operating position, to read the row of marking elements for the navigation of the gantry lifting device, where the row of marking elements is arranged next to the clearance profile of the gantry lifting device.

20 Claims, 6 Drawing Sheets

(51) Int. Cl.
*B66C 19/00* (2006.01)
*G05D 1/02* (2020.01)
*B66C 13/18* (2006.01)
*B66C 13/40* (2006.01)

(52) U.S. Cl.
CPC .......... *B66C 19/005* (2013.01); *B66C 19/007* (2013.01); *G05D 1/0261* (2013.01); *G05D 2201/0205* (2013.01)

(56) References Cited

FOREIGN PATENT DOCUMENTS

| CN | 104058261 A | | 9/2014 | |
| CN | 105980287 A | | 9/2016 | |
| DE | 102006044645 A1 | | 4/2008 | |
| DE | 102008011539 B3 | * | 6/2009 | ............. G01S 17/88 |
| DE | 102011001847 A1 | | 10/2012 | |
| DE | 102014100833 B3 | | 3/2015 | |
| JP | H07144878 A | | 6/1995 | |
| JP | 1998105235 | * | 1/1998 | ............... G05D 1/02 |
| JP | H10105235 A | | 4/1998 | |
| JP | 2000153988 A | * | 6/2000 | |
| JP | 2000153988 A | | 6/2000 | |
| JP | 2001163575 A | | 6/2001 | |
| JP | 2003192268 A | | 7/2003 | |
| JP | 2009223561 A | | 10/2009 | |

OTHER PUBLICATIONS

Written Opinion of the International Searching Authority from corresponding Patent Cooperation Treaty (PCT) Application No. PCT/EP2017/076099, indicated completed on Jan. 26, 2018.

International Preliminary Examination Report from corresponding Patent Cooperation Treaty (PCT) Application No. PCT/EP2017/076099, transmitted Oct. 2, 2018.

Preliminary Report on Patentability of International Searching Authority in English from corresponding Patent Cooperation Treaty (PCT) Application No. PCT/EP2017/076099, completed Oct. 2, 2018.

* cited by examiner

ARRANGEMENT OF A GANTRY LIFTING DEVICE AND OF A ROW OF SPACED-APART MARKING ELEMENTS

CROSS REFERENCE TO RELATED APPLICATION

The present application claims the priority benefits of International Patent Application No. PCT/EP2017/076099, filed Oct. 12, 2017, and claims benefit of German patent application DE 10 2016 119 793.3, filed on Oct. 18, 2016.

BACKGROUND AND FIELD OF THE INVENTION

System for the navigation of a gantry lift device which can be moved in an automatically guided manner by means of grid navigation, in particular in the form of a straddle carrier, for handling containers, comprising a row of spaced-apart marking elements.

The invention relates to a system for the navigation of a gantry lift device, in particular in the form of a straddle carrier, for handling containers, in particular ISO containers, wherein the gantry lift device of the system can be moved in an automatically guided manner by means of grid navigation and is arranged in order to change between two mutually crossing or two adjacent parallel lanes of the system by turning or by means of a lane change, wherein the gantry lift device has a sensor apparatus for the navigation of the gantry lift device and a clearance profile which is formed in such a manner that the gantry lift device can move across a container, and wherein the gantry lift device and a row of spaced-apart marking elements are arranged such that the gantry lift device can be moved within the respective lane along the row of marking elements by means of grid navigation, wherein the row of marking elements can be read by the sensor apparatus of the gantry lift device.

Gantry lift devices, which are also called gantry lift trucks, gantry lift stacking trucks, gantry stacking trucks, straddle carriers, van carriers, shuttle carriers, sprinter carriers or runners, are generally known. These are special handling devices for standardised ISO containers in terminals, in particular port terminals or terminals for combined road and rail transport. With the aid of a lifting device and a load picking-up means defined as a spreader, gantry lift devices can lift containers and set them down at a target location after transportation. Since the floor-bound gantry lift devices which are provided with rubber tyres have a spider leg-like structure which has four gantry struts disposed in the corners of a notional rectangle, they can travel over a container resting on the ground or on another container and thus additionally also transport a raised container depending on construction. In dependence upon the construction height, the gantry lift devices are designated e.g. as 1-over-3 devices, 1-over-2 devices etc. A 1-over-3 device can set a container down on 3 containers stacked on top of one another, pick up the uppermost one of 4 containers stacked on top of one another or travel over 3 containers, which are stacked on top of one another, with a picked-up container. In conjunction with this, ISO containers are understood to be standardised large-volume or sea-freight containers which are used in the international transportation of goods. The most widely used are ISO containers with a width of 8 feet and a length of 20, 40 or 45 feet. The gantry lift device is not rail-bound and therefore is freely movable and is typically driven diesel-electrically, diesel-hydraulically or fully electrically.

Gantry lift devices which can be guided automatically according to the principle of so-called grid navigation are also known. In this case, the ground on which the gantry lift devices move has marking elements embedded therein which are detected and read by the sensor apparatus. In most cases, the marking elements are passive transponders or magnets. If the marking elements are designed as transponders, the designation of transponder navigation is also common. The marking elements are distributed over the surface of the entire port and terminal site in the region of the travel routes. The grid navigation is also defined as the FROG method (Free Ranging On Grid). The FROG method is described in greater detail in relation to driverless, floor-bound transport vehicles having rubber tyres in German laid-open document DE 10 2006 044 645 A1. In order to navigate the transport vehicle along the marking elements, the transport vehicle has a sensor apparatus disposed thereon which can comprise antennas and/or magnetic field sensors. During travel over a container, the sensor apparatus is used for identifying the marking elements embedded in the roadway and for reading the co-ordinates of the respective marking element as information. The reading can also detect decoding of the information if said information is stored in encoded form in the marking elements or is made available to be read. For this purpose, sensor apparatuses of the transport vehicles have flat, wide parts having sensors which are mounted at the front and rear on the transport vehicle just above the ground and in parallel therewith. The parts of the sensor apparatus extend transversely with respect to the direction of travel over the entire vehicle width of the transport vehicle so that overall the sensor apparatus detects in each case more than one marking element at any one time. The information read from the marking elements via the sensor apparatus is then used for the navigation of the vehicle. Since the marking elements are embedded into the ground in a fixed grid, this navigation method is designated as grid navigation.

German patent document DE 10 2014 100 833 B3 discloses a gantry lift device for handling containers which is automatically controlled by means of grid navigation. The antennas of the sensor apparatus which serve as sensors are mounted on the running gear unit supports of the gantry lift device and, for the navigation of the gantry lift device, must be pivoted between the running gear unit supports into the clearance profile underneath the gantry lift device in order to be able to read marking elements which, in this operating position, are located between the running gear unit supports underneath the clearance profile. The antennas of the sensor apparatus can also be pivoted to a rest position underneath the running gear unit supports of the gantry lift device. However, in this case, grid navigation of the gantry lift device is not effected. In contrast, in the operating position it is not possible to perform a loading operation, in which a container can be picked up or set down. This is due to the fact that the sensor apparatus in the operating position protrudes between the running gear unit supports into the clearance profile and covers the entire width of the gantry lift device.

DE 10 2011 001 847 A1 discloses a gantry lift device comprising sensors for the automatically guided navigation of the gantry lift device. The sensors are arranged underneath running gear unit supports of the gantry lift device. Moreover, transponders which serve as marking elements can be embedded into a floor. This document does not disclose anything in relation to the arrangement of the gantry lift device and its sensors relative to the transponders.

SUMMARY OF THE INVENTION

The present invention provides an improved system for the navigation of a gantry lift device which can be moved in an automatically guided manner by means of grid navigation, comprising a row of spaced-apart marking elements.

In accordance with the invention, in the case of a system for the navigation of a gantry lift device, in particular in the form of a straddle carrier, for handling containers, in particular ISO containers, wherein the gantry lift device of the system can be moved in an automatically guided manner by means of grid navigation and is arranged in order to change between two mutually crossing or two adjacent parallel lanes of the system by turning or by means of a lane change, wherein the gantry lift device has a sensor apparatus for the navigation of the gantry lift device and a clearance profile which is formed in such a manner that the gantry lift device can move across a container, and wherein the gantry lift device and a row of spaced-apart marking elements are arranged such that the gantry lift device can be moved within the respective lane along the row of marking elements by means of grid navigation, wherein the row of marking elements can be read by the sensor apparatus of the gantry lift device, an improvement is achieved by virtue of the fact that the sensor apparatus, in an operating position, is arranged outside the clearance profile in order, in the operating position, to read the row of marking elements for the navigation of the gantry lift device, wherein the row of marking elements is located next to, in particular both horizontally and vertically next to, the clearance profile of the gantry lift device and in particular underneath a running gear unit support of the gantry lift device.

Provision is thus made that the sensor apparatus is arranged on the gantry lift device such that marking elements located next to clearance profile can be read. In this case, the marking elements are located preferably next to a vertical projection surface of the clearance profile and in particular underneath a vertical projection surface of a sensor of the sensor apparatus and in particular underneath the first and/or second running gear unit support of the gantry lift device or a vertical projection surface of the corresponding running gear unit support. In the present case, a vertical projection surface is understood to be the surface of a vertical projection onto the ground underneath the gantry lift device. According to this understanding, the marking elements are also then located next to the clearance profile or its vertical projection surface if, in this case, they are embedded completely in the ground or under the surface thereof into the roadway and thus are located not only horizontally next to the clearance profile or its vertical projection surface but are additionally also located deeper in relation to the clearance profile and thus both horizontally and vertically next to the clearance profile. However, according to this understanding the marking elements are not located next to the clearance profile if they are located without any horizontal offset by reason of being embedded into the roadway merely deeper than the clearance profile and thus only underneath the clearance profile.

Only by reason of the sensor apparatus positioned in the operating position outside the clearance profile and of the marking elements located in this case in the above sense next to the clearance profile is it thus possible that, even when a container is being picked up or set down during the loading operation, the gantry lift device can navigate in an automatically guided manner by means of grid navigation without restriction and hindrance. In its operating position, the sensor apparatus thus allows the container to be transported to be picked up or set down. The arrangement of the sensor apparatus close to the ground outside the clearance profile also has an advantageous effect upon the travel operation because, unlike in the above-mentioned prior art, the sensor apparatus in its operating position during the travel operation is not located underneath the container which is to be raised correspondingly high enough for this purpose. Therefore, the minimum lifting height of the container required for the travel operation is advantageously independent of the operating position of the sensor apparatus. By arranging the sensor apparatus outside the clearance profile, automatic operation, effected by means of the sensor apparatus, according to the principle of grid navigation is also possible when the clearance profile is completely pervaded or filled by other objects.

In this case, the sensor apparatus which is arranged preferably on one or both of the two running gear unit supports and in particular on the respective underside thereof comprises at least one sensor in the form of an antenna or a magnetic field sensor in order to be able to read and in this case optionally decode the marking elements, which are designed as transponders or magnets, in particular their co-ordinates. Basically, the sensor can also comprise an antenna and a magnetic field sensor. As will be explained in greater detail below with reference to the description of the figures, the sensor apparatus can also have a plurality of sensors. If transponders are used for navigation, the so-called half-duplex method is generally used with a sensor apparatus which is correspondingly suitable for this purpose. In this case, the sensor apparatus initially emits an electromagnetic field in order to charge the transponders with power so that the transponders can then transmit, as a response, information such as the corresponding co-ordinates. Then, the transmitted information is again received and read by the sensor apparatus and is used for the navigation of the gantry lift device.

By arranging the sensor apparatus outside the clearance profile, already existing marking elements arranged in a grid-like fashion can be easily used for grid navigation and for this purpose can be allocated to a lane such that the gantry lift device or its running gear unit support is located in relation to the marking elements such that the marking elements can be read by the sensor apparatus. In this manner, it is possible to avoid an increase in the grid density of marking elements.

Provision is made in a structurally simple manner that the sensor apparatus comprises a first part having at least one sensor and comprises a second part having at least one sensor. Accordingly, both parts of the sensor apparatus are arranged in the operating position outside the clearance profile. Preferably, a part of the sensor apparatus is arranged in this case on each one of two running gear unit supports of the gantry lift device in order to be able to read marking elements which are located underneath the first and/or second running gear unit support or the associated vertical projection surface. For this purpose, the parts of the sensor apparatus can each be arranged on the underside of the corresponding running gear unit support. Each part of the sensor apparatus can also have two or more sensors, as explained in the following description of the figures below, so that the sensor apparatus can comprise a total of e.g. four sensors.

The system preferably also comprises a lane, to which the row of marking elements is allocated such that, at least in a portion of the lane, the row of marking elements is located, as seen in the direction of the longitudinal extension of the lane, only in the left half or only in the right half.

In a particularly preferred alternative embodiment of the system, provision is made that the row of marking elements is located in relation to the gantry lift device and in particular underneath one of its running gear units such that the row of marking elements can be read only by the first part of the sensor apparatus, which has at least one sensor, or only by the second part of the sensor apparatus which has at least one sensor. In the corresponding portion of the lane, only one row of marking elements is thus located in one of the two halves of the lane, in particular only underneath one of the two parts of the sensor apparatus which is arranged preferably on one of the two running gear unit supports or the underside thereof. Therefore, in such portions the grid navigation would require only one of the two parts of the sensor apparatus in order to read the marking elements because the respective other part cannot detect and read any marking elements. Accordingly, a second row of marking elements is also not required in the other half of the lane or underneath the other running gear unit support. Therefore, the total number of marking elements required for reliable grid navigation can be considerably reduced. In terms of a minimum configuration, the gantry lift device could also be equipped in corresponding portions only with one of the two parts of the sensor apparatus having a single sensor.

In this case, provision can also be made in an advantageous manner that the row of marking elements is adjoined by a branching row of spaced-apart marking elements such that the gantry lift device can be moved by means of grid navigation along the branching row of marking elements, wherein the branching row of marking elements can be read only by the first part or only by the second part of the sensor apparatus of the gantry lift device. In this case, the two rows of marking elements can be located with respect to one another such that said marking elements branch into a transversely extending second lane. Then, when the gantry lift device turns along the branch into the second lane it is possible that the same part of the sensor apparatus reads marking elements before and after the gantry lift device turns from the first row to the branching row, or the respective other part of the sensor apparatus reads marking elements after the gantry lift device turns. A change can thus be performed such that, after the turn, marking elements are read on a vehicle side of the gantry lift device different to that before the turn. This applies both to turning left and also to turning right, depending on which half of the second lane the branching row of marking elements is located in. In this case, the gantry lift device thus also requires the two parts of the sensor apparatus with in each case at least one sensor. However, in corresponding portions of the branching second lane, it is also possible in an advantageous manner to dispense with a second row of marking elements.

In an advantageous embodiment, provision can thus be made that, after the gantry lift device has turned, the marking elements are located in relation to the gantry lift device such that the branching row of marking elements can be read by the same or a different part of the sensor apparatus than that before the turn.

Moreover, provision can be made that one of the lanes for the gantry lift device is allocated the row of marking elements such that, at least in one portion of the lane, the row of marking elements is located, as seen in the direction of the longitudinal extension of the lane, only in the left half or only in the right half and no marking elements are located in particular in the portion of the lane in the right half or in the left half.

However, in a crossing region of two lanes which adjoins the portion and which connects together the two lanes or at least two rows of marking elements branching from one another, and in particular in regions adjacent thereto, additional marking elements can also be provided in order to ensure that at least two marking elements can always be read if the gantry lift device is being navigated when turning through the corresponding crossing region. A marking element can also be detected and read in particular in the crossing regions on each vehicle side.

In an advantageous manner, provision can also be made that in each case a row of marking elements is located in the crossing region in the left half and right half, as seen in the direction of the longitudinal extension of both mutually crossing lanes.

According to a further advantageous arrangement, a second row of spaced-part marking elements is provided which is located such that the gantry lift device can be moved by means of grid navigation along the two rows of marking elements, wherein one of the two rows of marking elements can be read by a first part of the sensor apparatus which has at least one sensor, and the other of the two rows of marking elements can be read by a second part of the sensor apparatus which has at least one sensor. Preferably, the second row of marking elements is located in this case in the portion of the aforementioned lane such that in each case only one of the rows extends in one half of the lane and in this case in particular both rows extend in parallel with one another. Therefore, the gantry lift device travels in this case at the same time along the two rows, wherein the marking elements thereof are also read.

Provision can also be made that the two rows of marking elements are adjoined by two branching rows of spaced-apart marking elements such that the gantry lift device can be moved by means of grid navigation along the branching rows of marking elements, wherein one of the two branching rows of marking elements can be read by the first part of the sensor apparatus and the other of the two branching rows of marking elements can be read by the second part of the sensor apparatus. In this case, the rows of marking elements are located with respect to one another such that said marking elements branch into a transversely extending second lane. The two branching rows are located in a corresponding portion of the branching second lane in a similar manner to the aforementioned two rows so that in each case only one of the branching rows extends in one half of the branching lane and in this case in particular the two branching rows extend in parallel with one another. The arrangement of the gantry lift device or the two parts of the sensor apparatus in relation to the respective two rows of marking elements is identical before and after turning into the second lane.

The invention will be described with reference to the following figures.

DESCRIPTION OF THE PREFERRED EMBODIMENTS

Figure 1A:
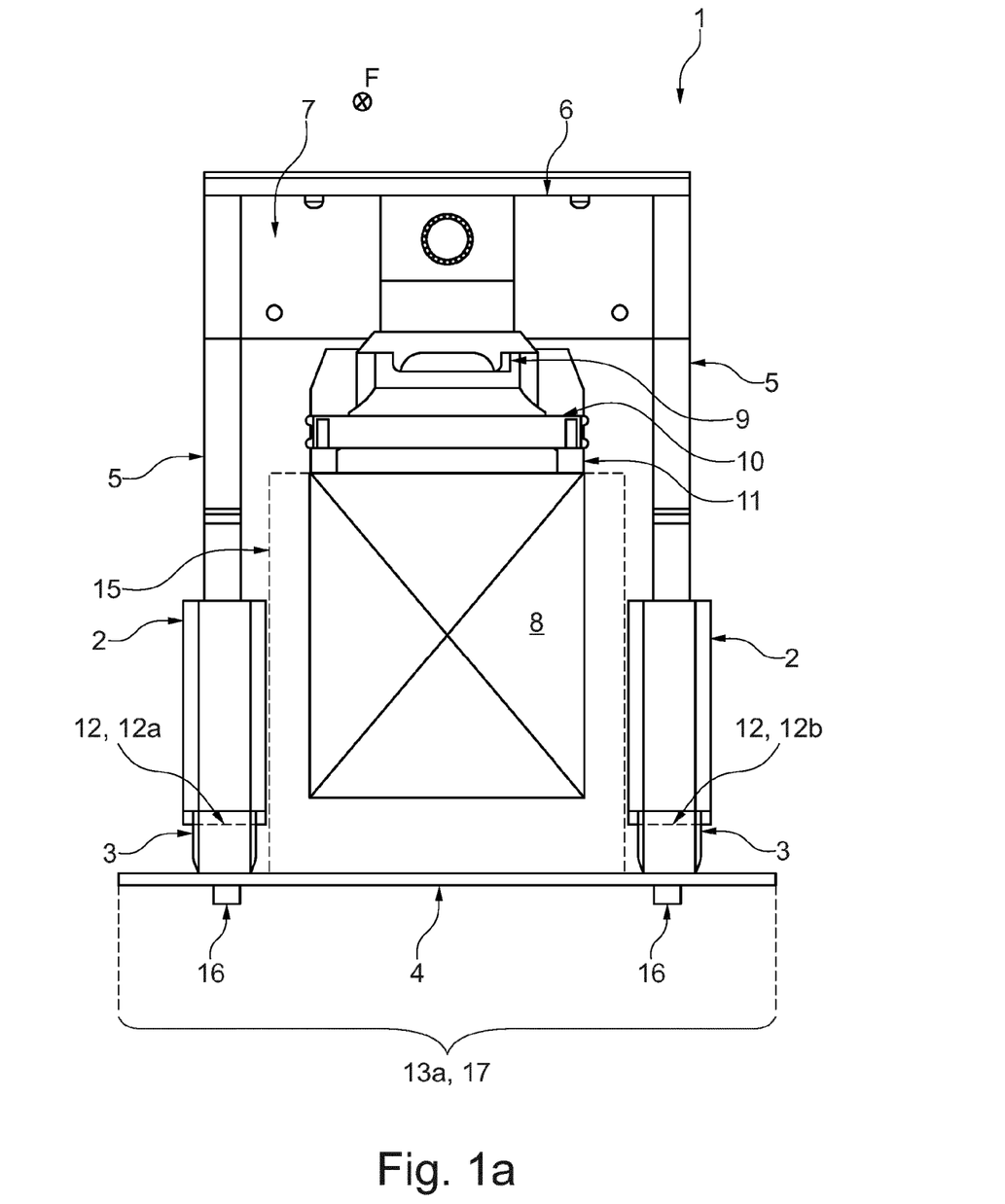
FIG. 1a shows a gantry lift device in a system for the navigation of the gantry lift device in a first embodiment.

FIG. 1a shows a schematic view of a first embodiment of a system for the navigation of a gantry lift device 1 in a container handling operation. The gantry lift device 1 incorporated into this system can be guided automatically by means of grid navigation in the above-defined sense and is operated and controlled accordingly in a driverless or unmanned manner. In this respect, driverless automated operation of a corresponding gantry lift device 1 can also be achieved when an accompanying driver is present but in this case does not actively intervene in the control of the gantry lift device 1.

The gantry lift device 1 has two mutually parallel running gear unit supports 2 which are oriented in the longitudinal direction of the gantry lift device 1 and on which steerable wheels 3 are mounted. Since FIG. 1a illustrates by way of example a rear view of the gantry lift device 1 during travel straight-ahead in the travel direction F, only the rear wheels 3 can be seen and the front wheels 3 are concealed. The wheels 3, of which in each case two are arranged on one of the running gear unit supports 2, are provided with rubber tyres filled with air or gases, in the manner of pneumatic tyres, and can move thereon in a floor-bound but not rail-bound manner and are thus freely movable, wherein they run on a ground surface 4 of a container terminal, preferably in a port. Accordingly, the gantry lift devices 1 in the present case are to be distinguished from rail vehicles. The wheels 3 are disposed in a conventional manner in the corners of a notional rectangle. It is fundamentally also possible to provide more than four rubber-tired wheels 3 if this is required for technical reasons. This is then associated with an overall increase in the complexity of the gantry lift device 1 and therefore more complex technology must be employed in the area of the drive and steering. The drive of the gantry lift device 1 is typically diesel-electric, diesel-hydraulic or fully electric, in particular battery-electric, and accordingly comprises components such as e.g. a diesel engine and generator, batteries and/or hydraulic units. In order to form the spider leg-like gantry structure, a total of four gantry struts 5 extend from the running gear unit supports 2 in each case at the front and rear vertically upwards, said gantry struts forming, together with an attached machine platform 6 connecting the gantry struts 5, a gantry 7. Arranged on the machine platform 6 of the gantry 7 is a lifting device 9 for a container 8, to which lifting device a load picking-up means for the containers 8 which is defined as a spreader 10 is connected such that it can be lifted and lowered. For the purpose of picking up loads, the spreader 10 can be locked to the container 8 at its four corner fittings 11.

As illustrated by way of example in FIG. 1a, the gantry lift device 1 can move within a first lane 13a defined on the ground 4 and in this case can be guided automatically according to the principle of grid navigation. As part of this procedure, the precise vehicle positions and orientations on the ground 4 of the container terminal and in particular within the first lane 13a are determined continuously. For this purpose, the first lane 13a is allocated two rows of marking elements 16 (see also FIG. 4a) which are located within the first lane 13a in the region of the ground 4. As seen in the direction of the longitudinal extension of the lane 13a, the first lane 13a has two halves. In the portion 17 illustrated in FIG. 1a (see also FIG. 4a) of the lane 13a, each of these halves is allocated one of the two rows of marking elements 16. Both rows extend preferably in parallel with one another. However, by reason of the view selected in FIG. 1a, only one marking element 16 of each row can be seen. Preferably, the two rows are spaced apart from one another such that in each case a row of marking elements 16 is located under each running gear unit support 2 or its vertical projection surface, in order to be able to be read by the sensor apparatus 12 of the gantry lift device 1.

Figure 1B:
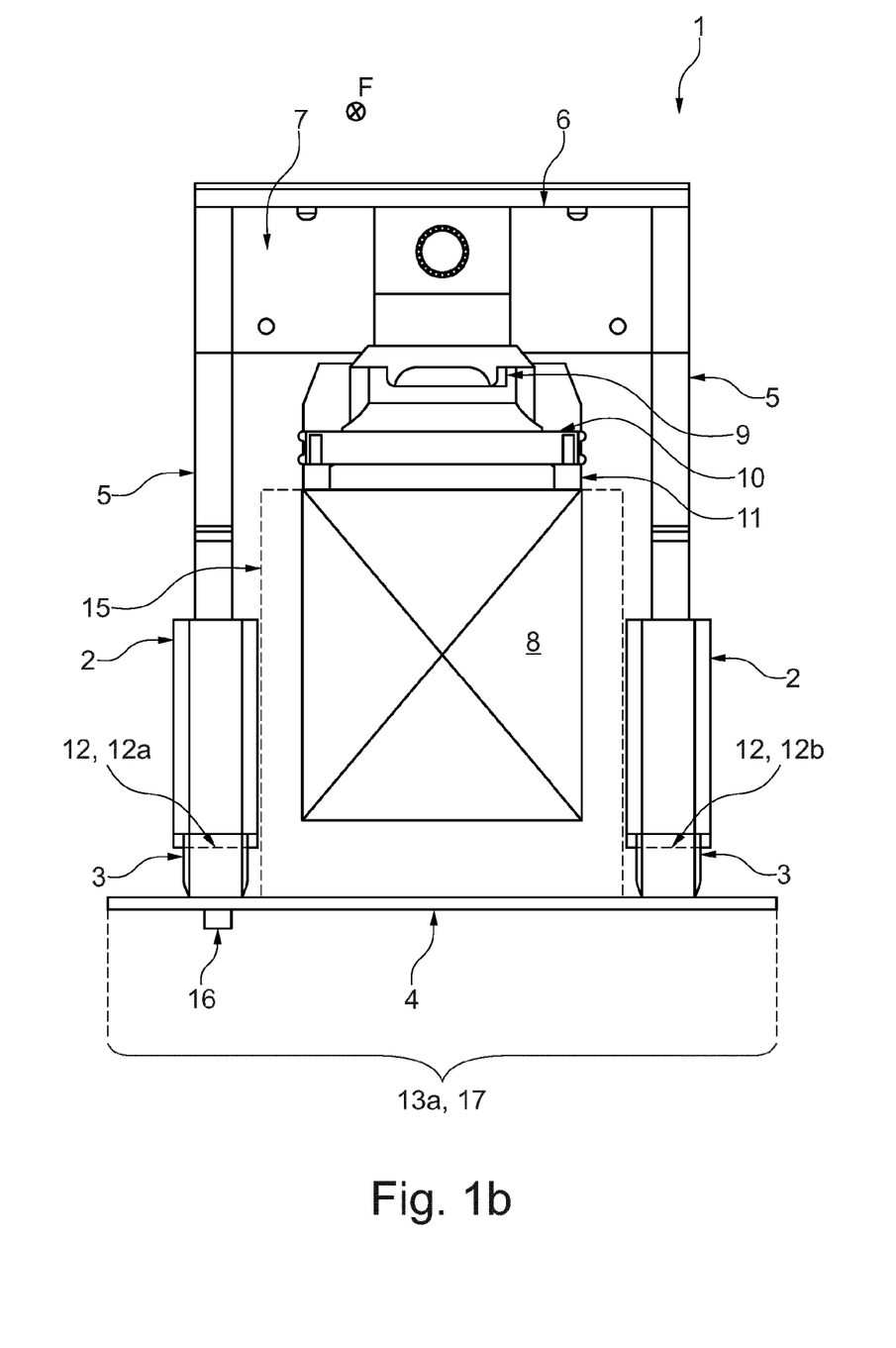
FIG. 1b shows the gantry lift device of FIG. 1a in a system for the navigation of the gantry lift device in a second embodiment.

FIG. 1b shows the gantry lift device of FIG. 1a in a second embodiment of the system for the navigation of the gantry lift device 1. The second embodiment illustrated in FIG. 1b differs from the first embodiment essentially in that only one row of marking elements 16 is provided in the first lane 13a at least in the portion 17 (see also FIG. 4b). In contrast to the first embodiment, one of the two rows of marking elements 16 of the first embodiment has been omitted, as illustrated in FIG. 1b. In FIG. 1b, a row of marking elements 16 is located by way of example in the portion 17 only in the left half of the lane 13a, whereas the right half of the lane 13a in the portion 17 is free of marking elements 16. In this case, the respective row of marking elements 16 is located underneath one of the two travel supports 2, in particular underneath the vertical projection thereof onto the ground 4. Accordingly, no marking elements 16 are located underneath the other one of the two travel supports 2. Alternatively, the allocation of the row of marking elements 16 within the lane 13a can also be reversed so that marking elements 16 are located only in the right half of the portion 17 of the lane 13a. For the remainder, the statements provided in respect of FIG. 1a also apply accordingly to FIG. 1b.

The marking elements 16 each comprise a transponder, in particular a passive transponder, or a magnet. In this case, the marking elements 16 can be embedded into the ground 4 and in particular can be located completely under a surface of the ground 4, on which the wheels 3 of the gantry lift device 1 run. The gantry lift device 1 is guided automatically along the row of marking elements 16, in that the marking elements 16 can be read by a sensor apparatus 12 of the gantry lift device 1 and the read information, as measurement signals, can influence the automatic navigation of the gantry lift device 1. For this purpose, the coordinates of the corresponding marking element 16 are stored as information in each marking element 16 and are made available to be read. The reading can also detect decoding of the information if said information is stored in encoded form in the marking elements 16 or is made available to be read.

In order to be able to determine the position and orientation of the gantry lift device 1, two mutually spaced-apart marking elements 16 are always read by the sensor apparatus 12. As a result, the position and orientation of the gantry lift device 1 can be determined both relative to the corresponding marking elements 16 and also thereby within the container terminal or the corresponding lane 13a, 13b and can be used for the automatically guided navigation. In principle, the sensor apparatus 12 can be designed in one piece and can comprise only one sensor which is then designed accordingly such that two marking elements 16 can be read by the sensor at the same time. Continuous determination of the vehicle position and orientation is thus even possible if a sensor of the sensor apparatus 12 is provided only in the region of a single vehicle side or the running gear unit support 2 at that location. This is also possible if the system according to the second embodiment has portions 17 having only one row of marking elements 16. Alternatively, simpler sensors can be also be used for the sensor apparatus 12, which sensors cannot read a plurality of marking elements 16 at the same time but instead can always read only one marking element 16 at a time. In this case, the sensor apparatus 12 has at least two such simple sensors. The dimensions of the sensor or sensors of the sensor apparatus 12 and the distances between the marking elements 16 are to be adapted to one another accordingly. Since more precise position and location determination of the gantry lift device 1 is possible with a greater distance between the marking elements 16, the simpler sensors can have smaller dimensions and can be mounted on the gantry lift device 1 at the required distance. As a result, the sensor apparatus 12 can also be accommodated overall in smaller receiving spaces. Moreover, the space between the sensors can be used for accommodating other components and a further distance between the marking elements 16 and thus a reduction in the total number of required marking elements 16 can be achieved.

In the case of the gantry lift device 1 which can be used for navigation in both embodiments of the system, the sensor apparatus 12 comprises four sensors which can each read one marking element 16. Two of the total of four sensors are arranged spaced apart from one another at the front and rear on the left first running gear unit support 2 between the associated wheels 3 and form a first part 12a of the sensor apparatus 12 (see also FIGS. 2, 3, 4a and 4b). In the same manner, two sensors are arranged on the right second running gear unit support 2 and form a second part 12b of the sensor apparatus 12. It is thus arranged on each vehicle side of the gantry lift device 1 of one of the parts 12a or 12b of the sensor apparatus 12. FIGS. 1a and 1b illustrate the respective rear sensor of the two parts 12a, 12b in broken lines. The parts 12a, 12b can also each comprise only one sensor which can read two marking elements 16 at the same time.

FIGS. 1a and 1b illustrate a clearance profile 15 of the gantry lift device 1 in each case with a broken line, said clearance profile being formed underneath the gantry lift device 1 and being dimensioned at least large enough that the gantry lift device 1—perpendicular to the drawing plane—can travel across at least one container 8 in order to pass, pick up or set down the container 8. The clearance profile 15 thus encloses at least the clear space underneath the gantry lift device 21 which is required for travelling over at least one container 8 without collision. In this case, the clearance profile 15 extends between the two running gear unit supports 2 at least over one container width plus a certain tolerance. The clearance profile 15 thus corresponds at least to the outer contour of a container 8, which is set down on the ground 4, plus the desired tolerance. If the gantry lift device 1 is designed e.g. as a 1-over-3 device, the clearance profile 15 is dimensioned correspondingly higher. Accordingly, the container 8 is arranged, both in the loading operation when picking up and setting down the container 8 and also in the travel operation when transporting the picked-up container 8, within the clearance profile 15 and passes therethrough. In the present case, the clearance profile 15 is not to be understood to be the outer contour of the gantry lift device 1.

The sensor apparatus 12 is arranged on the gantry lift device 1 or its running gear unit supports 2 such that the sensor apparatus 12 in its operating position is arranged outside the clearance profile 15 and thus does not enter therein while the gantry lift device 1 is being automatically guided by means of grid navigation. This applies both during travel operation and also during loading operation and equally during empty travel without a picked-up container 8. In this case, the container 8 suspended from the spreader 10 can also be suspended in the clearance profile 15 lower than in FIG. 1a, in particular to as far as underneath the sensor apparatus 12 because this is arranged outside the clearance profile 15 and as a result a collision with the container 8 can be precluded.

Figure 2:
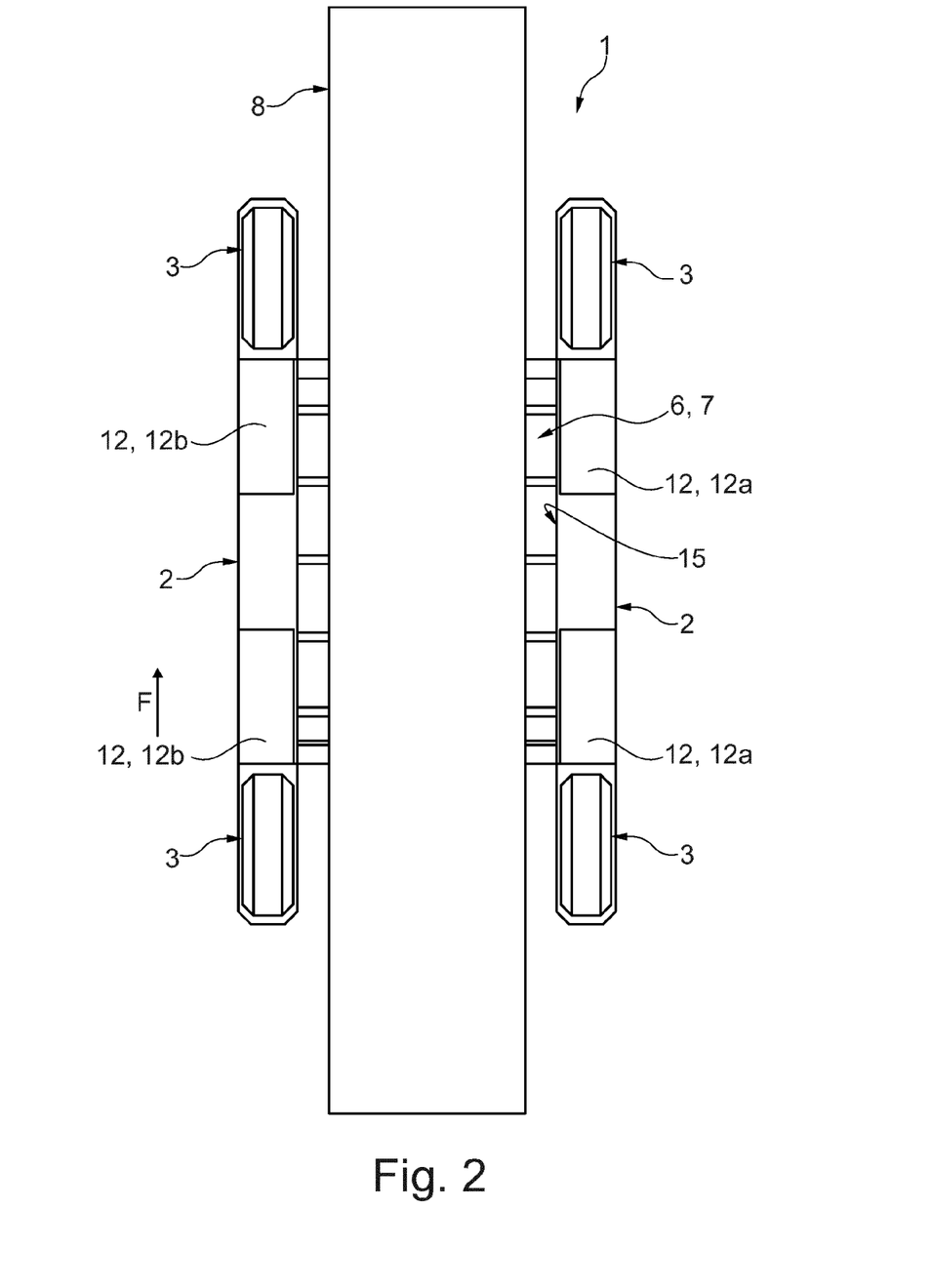
FIG. 2 shows a view of the gantry lift device of FIGS. 1a and 1b from below.
Figure 3:
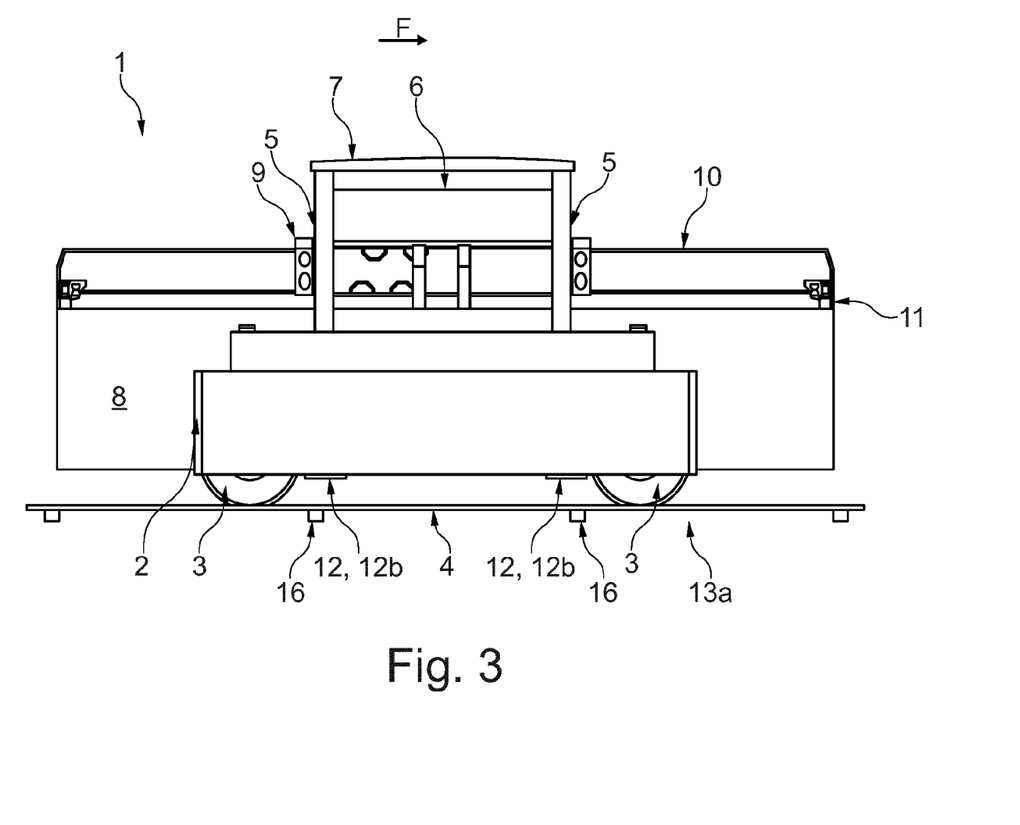
FIG. 3 shows a view of the system and the gantry lift device of FIGS. 1a and 1b from the side.

FIG. 2 shows a view of the gantry lift device 1 of FIGS. 1a and 1b from below. The figure shows the arrangement of the two parts 12a, 12b or the associated and mutually spaced-apart sensors on corresponding undersides of the running gear unit supports 2. The sensors or their flat housings extend horizontally or in parallel with the ground 4 (see also FIGS. 1a, 1b and 3) and in this case preferably have a rectangular base surface which extends with its longitudinal extension in the travel direction F of the gantry lift device 1. In this case, the sensor apparatus 12 extends, as also schematically illustrated in FIGS. 1a and 1b, in the direction of the clearance profile 15 and terminates flush with the corresponding running gear unit support 2 so that both the running gear unit supports 2 and the sensor apparatus 12 are adjacent to the clearance profile 15 and delimit same. Alternatively, the sensor apparatus 12 can also extend beyond the respective running gear unit support 2 so that the clearance profile 15 does not extend as far as the two running gear unit supports 2, but instead extends only as far as the sensor apparatus 12, is adjacent thereto and is delimited thereby. It is also feasible for the sensor apparatus 12 to protrude outwards beyond the corresponding running gear unit support 2. It is likewise feasible for the sensor apparatus 12 to extend at least partially within a vertical projection surface of the respective running gear unit support 2, without being located adjacent to the projection surface. The sensor apparatus 12 does not have to extend over the entire width between the running gear unit supports 2, but instead can be formed to be correspondingly narrower and more space-saving by reason of the described design and arrangement and optionally flush fit underneath the running gear unit supports 2. By reason of the above-described arrangement and design of the sensor apparatus 12 in its operating position, the clearance profile 15 is not adversely affected for lifting, lowering, setting-down and picking-up as well as travelling over containers 8.

Each sensor of the sensor apparatus 12 has an antenna and/or a magnetic field sensor in order to be able to read the marking elements 16 located in a positionally fixed manner, as soon as the corresponding marking elements 16 are located in the detection region of the sensor apparatus 12 by reason of the movement of the gantry lift device 1. The detection region typically includes a vertical projection surface underneath the sensor apparatus 12 or its sensors, wherein typically a reading distance is to be maintained between the sensors and the marking elements 16, which distance can be e.g. about 10 to 40 cm. For this purpose, the sensors of the sensor apparatus 12 are arranged on the gantry lift device 1 accordingly just about in a region close above the ground 4 or the marking elements 16 provided at that location.

Figure 4A:
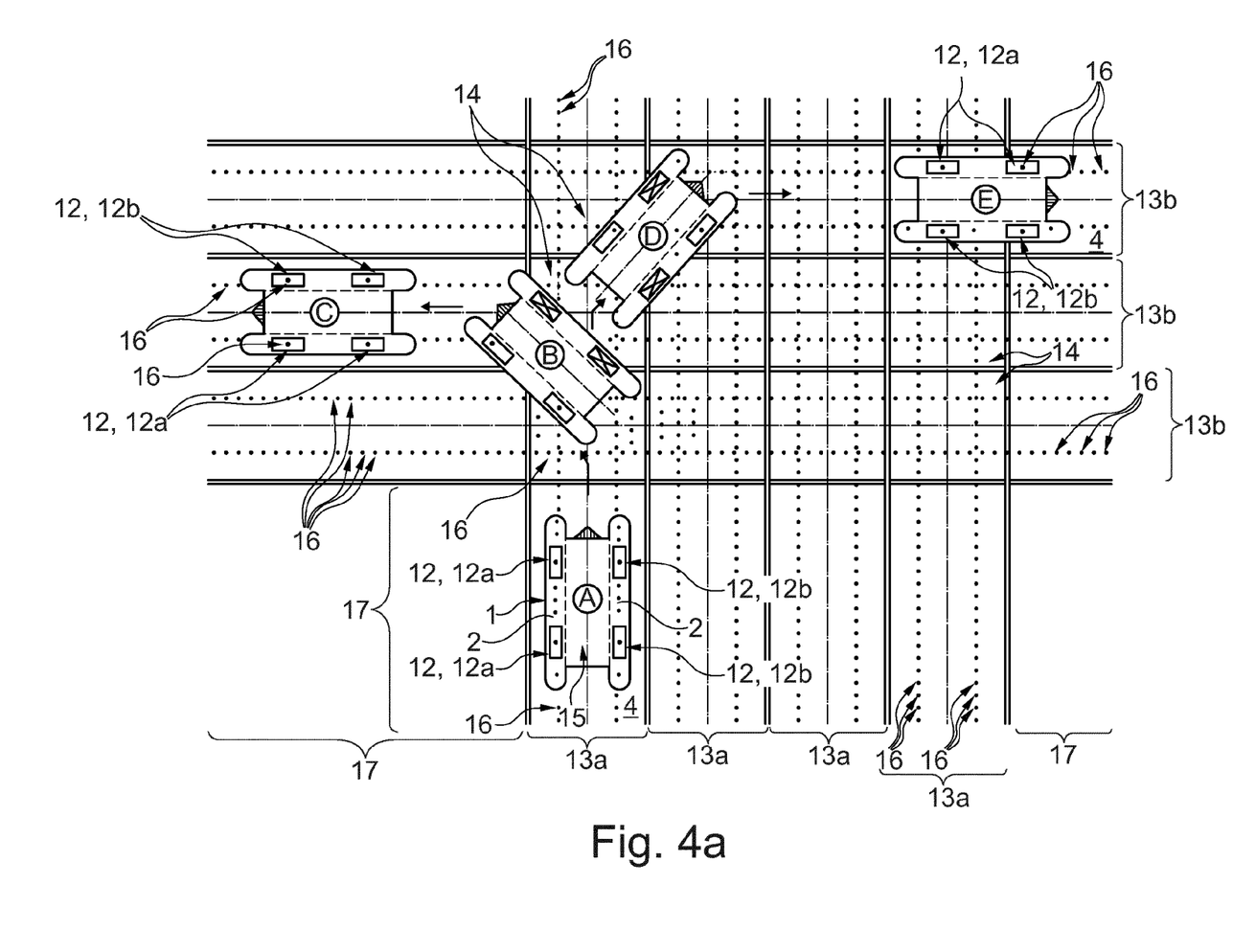
FIG. 4a shows various positions of the gantry lift device in the system for the navigation of the gantry lift device according to the first embodiment in a plan view.
Figure 4B:
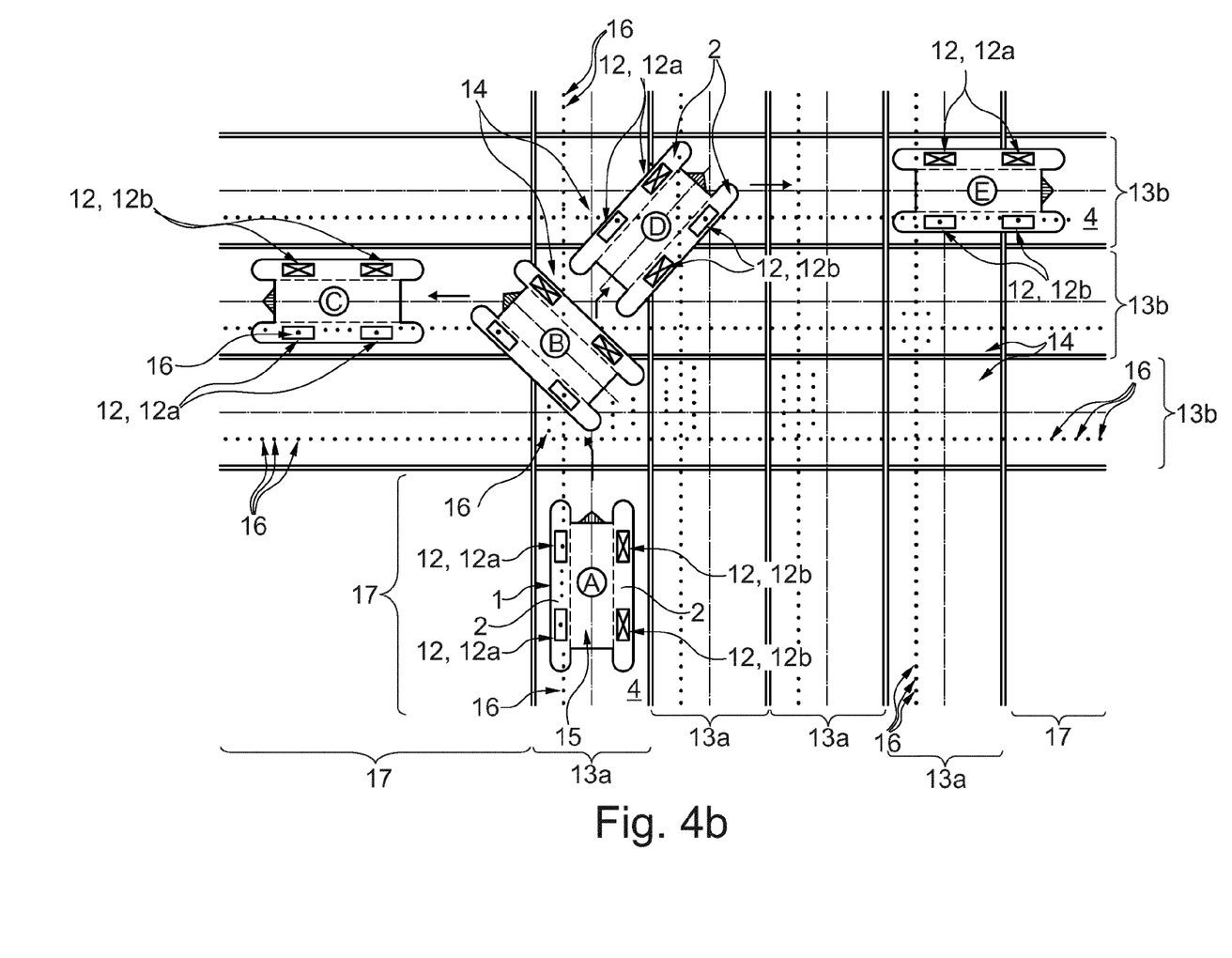
FIG. 4b shows the positions of the gantry lift device of FIG. 4a in the system for the navigation of the gantry lift device according to the second embodiment in a plan view.

FIGS. 4a and 4b each show one of the two embodiments of the system for the navigation of gantry lift devices 1 and, in this connection, different positions or arrangements of the gantry lift device 1 in a plan view. The figures illustrate in each case a plurality of first lanes 13a which are arranged next to one another and extend in parallel with one another, and a plurality of second lanes 13b which are likewise arranged in parallel with one another and next to one another and cross the first lanes 13a in each case in a crossing region 14.

In FIG. 4a, each lane 13a, 13b is allocated two rows of marking elements 16, as already described above with reference to FIG. 1a. As a result, the illustrated gantry lift device 1, at least during travel straight-ahead in the corresponding lanes 13a, 13b, e.g. in the positions A, C and E illustrated by way of example, can read with each part 12a, 12b of the sensor apparatus 12 the corresponding marking elements 16 because the gantry lift device 1 is always positioned at that location with both running gear unit supports 2 and the associated sensors over the marking elements 16.

In contrast, in FIG. 4b, each lane 13a, 13b is allocated only a single row of marking elements 16, as already described above with reference to FIG. 1b. This applies at least to the illustrated portions 17 and with the exception of the crossing regions 14. As a result, the illustrated gantry lift device 1, at least during travel straight-ahead in the portions 17 of the corresponding lanes 13a, 13b, e.g. in the positions A, C and E illustrated by way of example, can read with only one of the two parts 12a, 12b of the sensor apparatus 12 the corresponding marking elements 16. Therefore, marking elements 16 are read at least in the portions 17 only in the region of a vehicle side or a running gear unit support 2 by the sensor apparatus 12 at that location. For this purpose, the gantry lift device 1 at this location is located accordingly within the corresponding lane 13a or 13b in relation to the corresponding row of marking elements 16, in particular with one of the two running gear unit supports 2 and the associated sensors above the corresponding row of marking elements 16. Therefore, it is possible that, at the container terminal, considerably fewer marking elements 16 are required in order to be able to navigate with a corresponding gantry lift device 1 automatically according to the principle of grid navigation. The number of marking elements 16, in particular in the portions 17, can be halved in comparison with the first embodiment, in which for each lane 13a, 13b two parallel rows of marking elements 16 are located at least in the portions 17.

It is apparent that, in both embodiments, those marking elements 16 which are read by the sensor apparatus 12 are never located underneath the clearance profile 15, but instead are always located adjacent thereto and in particular underneath at least one of the running gear unit supports 2. In both embodiments, the gantry lift device 1 is located, at least in the portions 17, completely within the corresponding lane 13a or 13b.

Possible travel routes which can be travelled by the gantry lift device 1 both in the system of the first and also the second embodiment in an automatically guided manner by means of grid navigation will be described by way of example hereinafter.

In a starting position A, the gantry lift device is located in portion 17 of one of the first lanes 13a. Proceeding therefrom, the gantry lift device 1 can travel straight-ahead along the longitudinal extension of the first lane 13a. The gantry lift device 1 can also turn via a position B to the left into one of the transversely extending second lanes 13b adjoining the first lane 13a. After turning, the gantry lift device 1 is located in the portion 17 of the corresponding second lane 13b in a position C in which travel straight-ahead can likewise be performed. Alternatively, the gantry lift device 1 can also turn via a position D to the right into one of the transversely extending second lanes 13b adjoining the first lane 13a. After turning, the gantry lift device 1 is then located in the corresponding second lane 13b in a position E in which travel straight-ahead can likewise be performed.

For the purpose of automatically guided turning by means of grid navigation, according to the first embodiment in FIG. 4a, the two rows of marking elements 16 provided in the first lane 13a are adjoined by two rows of spaced-apart marking elements 16 which branch to the left and right respectively and which are allocated to the respective second lane 13b in the same manner as the two rows of the first lane 13a. According to the second embodiment in FIG. 4b, only one row of marking elements 16 branching to the left and right respectively is provided at least in the portions 17. The row of marking elements 16 which, as seen in the illustrated travel direction F of the gantry lift device 1, branches to the left is located, as seen in this direction, likewise in the left half of the second lane 13a. The row of marking elements 16 which, as seen in the illustrated travel direction of the gantry lift device 1, branches to the right is located, as seen in this direction, in the right half of the second lane 13a. Alternatively, however, in the case of the second embodiment an inverted arrangement of the rows of marking elements 16 in each case in the respective other half of the corresponding lane 13a, 13b would also be feasible.

The arrangement shown in FIG. 4b ensures that, when the gantry lift device 1 is moved within the first lane 13a, in particular during travel straight-ahead in the portion 17, only the row of marking elements 16 located in the region underneath the left first running gear unit support 2 is read because no marking elements 16 are located in the region underneath the right second running gear unit support 2. Accordingly, a marking element 16 is indicated in each case underneath the two sensors of the first part 12a of the sensor apparatus 12. In contrast, the two sensors of the second part 12b of the sensor apparatus 12 are designated by an X because no marking elements 16 can be detected and read in the corresponding position A. This also applies to travel in a first turning direction, when turning left during travel from position A to position C via position B in the present example illustrated in FIG. 4b.

When the gantry lift device 1 is moved in a second turning direction, when turning to the right in the present example likewise illustrated in FIG. 4b, the side of the gantry lift device 1 on which the sensor apparatus 12 reads the marking elements 16 changes from left to right. The change is effected during travel from position A to position E via position D when turning in the region of the position D in the respective crossing region 14. In this case, as illustrated in FIG. 4b, a marking element 16 can also be read for a short period of time in the region of each running gear unit support 2, i.e. by both parts 12a and 12b. This also applies to the first embodiment in FIG. 4a. In both embodiments shown in FIG. 4a and FIG. 4b, additional marking elements 16 can also be located in the corresponding crossing region 14 in order to ensure that two marking elements 16 can always be read at the same time. At the latest when travel around a bend during turning ends and the gantry lift device 1 is oriented accordingly in the second lane 13b, in the case of the second embodiment in FIG. 4b only the row of marking elements 16 located in the region underneath the right running gear unit support 2 is still read by means of the second part 12b of the sensor apparatus located at that point. Then, no more marking elements 16 are read on the left side. This is continued during onward travel, which follows after turning, as travel straight-ahead in the example position E.

If the gantry lift device 1 travels along one of the first lanes 13*a* without turning into one of the second lanes 13*b*, the side on which the marking elements 16 are read remains. This applies in the case of the present arrangement even when there is a change in lane between two adjacent parallel lanes 13*a* or 13*b*. When there is a change in the travel direction F of the gantry lift device 1 in the opposite direction, the same marking elements 16 are then read by the same sensors. However, these sensors are then located, as seen in the new opposite travel direction F, on the other vehicle side of the gantry lift device 1 than before the change in direction.

Of course, in contrast to the linear illustration in FIGS. 4*a* and 4*b*, the lanes 13*a* and 13*b* and the respectively allocated rows of marking elements 16 can also have curved progressions both in the portions 17 and in the crossing regions 14.

The invention claimed is:

1. A system for the navigation of a moveable gantry lift device over lanes in an automatically guided manner by grid navigation in order to change between two mutually crossing lanes or two adjacent parallel lanes by turning or by a lane change, said system comprising:
   - a gantry lift device configured as a straddle carrier for handling containers, wherein the gantry lift device is moveable in an automatically guided manner by grid navigation, and wherein the gantry lift device has a clearance profile configured such that the gantry lift device can move across a container without collision;
   - a row of marking elements for grid navigation spaced apart within a first lane for the gantry lift device; and
   - a sensor apparatus disposed on the gantry lift device, wherein the sensor apparatus is operable to read the marking elements for navigation of the gantry lifting device;
   - wherein the gantry lift device includes spaced apart running gear unit supports, and wherein the gantry lift device and the row of marking elements are arranged such that the gantry lift device can be moved within the first lane along the row of marking elements by grid navigation, and wherein the sensor apparatus in an operating position is arranged outside the clearance profile on the gantry lift device in order, in the operating position, to read the row of marking elements for navigation of the gantry lift device, and wherein the row of marking elements is located next to the clearance profile of the gantry lift device and underneath one of the running gear unit supports of the gantry lift device.

2. The system as claimed in claim 1, wherein the sensor apparatus comprises a first part having at least one sensor and comprises a second part having at least one sensor.

3. The system as claimed in claim 2, wherein the row of marking elements is located in relation to the gantry lift device underneath one of the running gear unit supports such that the row of marking elements can be read only by the sensor of the first part of the sensor apparatus, or only by the sensor of the second part of the sensor apparatus.

4. The system as claimed in claim 3, wherein the row of marking elements of the first lane is adjoined by a branching row of marking elements spaced apart within a second lane such that the gantry lift device can be moved by grid navigation along the branching row of marking elements, wherein the branching row of marking elements can be read only by the first part of the sensor apparatus or only by the second part of the sensor apparatus of the gantry lift device.

5. The system as claimed in claim 4, wherein after the gantry lift device has turned from the first lane to the second lane, the branching row of marking elements of the second lane are located in relation to the gantry lift device such that the branching row of marking elements can be read by the same or a different part of the sensor apparatus than that before the turn.

6. The system as claimed in claim 5, wherein the marking elements in at least one portion of either the first lane or the second lane for the gantry lift device are located, as seen in the direction of the longitudinal extensions of the first lane and second lane, only in a left half or only in a right half and no marking elements are located in the right half or the left half of the portion of the first lane or the second lane.

7. The system as claimed in claim 6, wherein the first lane and the second lane cross at a crossing region with the crossing region adjoining said at least one portion of either the first lane or the second lane, and wherein additional marking elements are provided in the crossing region in order to ensure that at least two marking elements can always be read by the sensor apparatus.

8. The system as claimed in claim 7, wherein a row of marking elements is located in both a left half and a right half of the crossing region as seen in the direction of the longitudinal extensions of both the first lane and the second lane.

9. The system as claimed in claim 8, wherein the row of marking elements of the first lane comprise a first row of marking elements, and wherein a second row of marking elements is spaced apart in the first lane with the second row of marking elements located such that the gantry lift device can be moved by grid navigation along the first row and second row of marking elements of the first lane, wherein one of the first row and second row of marking elements can be read by the first part of the sensor apparatus, and the other of the first row and second row of marking elements can be read by the second part of the sensor apparatus.

10. The system as claimed in claim 9, wherein the branching row of marking elements of the second lane comprises a first branching row of marking elements branching from the first row of marking elements of the first lane, and wherein a second branching row of marking elements spaced apart within the second lane is provided with the second branching row of marking elements adjoining the second row of marking elements of the first lane such that the gantry lift device can be moved by means of grid navigation along the first and second branching rows of marking elements, wherein one of the first and second branching rows of marking elements can be read by the first part of the sensor apparatus and the other of the first and second branching rows of marking elements can be read by the second part of the sensor apparatus.

11. The system as claimed in claim 2, wherein the row of marking elements of the first lane is adjoined by a branching row of marking elements spaced apart within a second lane such that the gantry lift device can be moved by grid navigation along the branching row of marking elements, wherein the branching row of marking elements can be read only by the first part of the sensor apparatus or only by the second part of the sensor apparatus of the gantry lift device.

12. The system as claimed in claim 11, wherein after the gantry lift device has turned from the first lane to the second lane, the branching row of marking elements of the second lane are located in relation to the gantry lift device such that the branching row of marking elements can be read by the same or a different part of the sensor apparatus than that before the turn.

13. The system as claimed in claim 1, wherein the marking elements in at least one portion of the first lane for the gantry lift device are located, as seen in the direction of the longitudinal extension of the first lane, only in a left half or only in a right half and no marking elements are located in the right half or the left half of the portion of the first lane.

14. The system as claimed in claim 4, wherein the first lane and the second lane cross at a crossing region with the crossing region adjoining said at least one portion of either the first lane or the second lane, and wherein additional marking elements are provided in the crossing region in order to ensure that at least two marking elements can always be read by the sensor apparatus.

15. The system as claimed in claim 14, wherein a row of marking elements is located in both a left half and a right half of the crossing region as seen in the direction of the longitudinal extensions of both the first lane and the second lane.

16. The system as claimed in claim 2, wherein the row of marking elements of the first lane comprise a first row of marking elements, and wherein a second row of marking elements is spaced apart in the first lane, with the second row of marking elements located such that the gantry lift device can be moved by grid navigation along the first row and second row of marking elements of the first lane, wherein one of the first row and second row of marking elements can be read by the first part of the sensor apparatus, and the other of the first row and second row of marking elements can be read by the second part of the sensor apparatus.

17. A system for the navigation of a moveable gantry lift device over lanes in an automatically guided manner by grid navigation in order to change between two mutually crossing lanes or two adjacent parallel lanes by turning or by a lane change, said system comprising:
   a gantry lift device configured as a straddle carrier for handling containers, wherein the gantry lift device is moveable in an automatically guided manner by grid navigation, and wherein the gantry lift device has a clearance profile configured such that the gantry lift device can move across a container;
   rows of marking elements spaced apart within respective parallel lanes extending in a first direction for the gantry lift device, wherein the lanes extending in the first direction comprise first lanes and the gantry lift device is configured for automatic guided movement within the first lanes; and
   a sensor apparatus disposed on the gantry lift device, wherein the sensor apparatus is operable to read the marking elements of the first lanes for navigation of the gantry lifting device;
   wherein the gantry lift device and the rows of marking elements of the first lanes are arranged such that the gantry lift device can be moved within the first lanes along the rows of marking elements by grid navigation, and wherein the sensor apparatus in an operating position is arranged outside the clearance profile on the gantry lift device in order, in the operating position, to read the rows of marking elements of the first lanes for navigation of the gantry lift device, and wherein the rows of marking elements of the first lanes are located next to the clearance profile of the gantry lift device.

18. The system as claimed in claim 17, further comprising:
   rows of marking elements spaced apart within respective parallel lanes extending in a second direction for the gantry lift device, wherein the lanes extending in the second direction comprise second lanes and the gantry lift device is configured for automatic guided movement within the second lanes; and
   wherein the rows of marking elements of the first lanes are adjoined by the rows of marking elements of the second lanes such that the gantry lift device can be moved by grid navigation along the rows of marking elements of the first lanes and the second lanes, and wherein the gantry lift device and the rows of marking elements of the second lanes are arranged such that the gantry lift device can be moved within the second lanes along the rows of marking elements by grid navigation, and wherein the sensor apparatus in an operating position is arranged outside the clearance profile on the gantry lift device in order, in the operating position, to read the rows of marking elements of the second lanes for navigation of the gantry lift device, and wherein the rows of marking elements of the second lanes are located next to the clearance profile of the gantry lift device.

19. The system as claimed in claim 18, wherein the gantry lift device includes running gear unit supports, and wherein the sensor apparatus comprises a first part having at least one sensor on a first one of the running gear unit supports and wherein the sensor apparatus comprises a second part having at least one sensor on a second one of the running gear unit supports, with the first one of the running gear unit supports being spaced apart from the second one of the running gear unit supports, and wherein in each case the rows of marking elements of the first lanes and second lanes are located in relation to the gantry lift device underneath one of the running gear unit supports such that a respective one of the rows of marking elements can be read only by the sensor of the first part of the sensor apparatus, or only by the sensor of the second part of the sensor apparatus.

20. The system as claimed in claim 18, wherein each of the first lanes and second lanes include a left portion and a right portion as seen in the direction of the respective longitudinal extension of the first lanes and second lanes, and wherein rows of marking elements are disposed in one or both of the left portion and the right portion of the first lanes and second lanes.

* * * * *